United States Patent

Sipin

[15] 3,690,340
[45] Sept. 12, 1972

[54] FLUID PROPORTIONING SYSTEM
[72] Inventor: Anatole J. Sipin, 117 E. 77th St., New York, N.Y. 10021
[22] Filed: March 5, 1970
[21] Appl. No.: 16,823

[52] U.S. Cl. ............137/93, 137/101.11, 137/205.5, 137/209, 137/564.5
[51] Int. Cl. .........E03d 9/03, E03b 7/07, G05d 11/00
[58] Field of Search..137/93, 98, 100, 101.11, 205.5, 137/209, 564.5, 7, 12

[56] References Cited

UNITED STATES PATENTS

| | | | |
|---|---|---|---|
| 1,333,986 | 3/1920 | Lundgaard | 137/100 |
| 2,058,309 | 10/1936 | Haering | 137/98 X |
| 2,323,341 | 7/1943 | McGill | 137/98 UX |
| 2,799,288 | 7/1957 | Knight | 137/98 |
| 2,849,015 | 8/1958 | Colson | 137/98 |
| 2,865,388 | 12/1958 | Sternbergh | 137/564.5 |
| 3,166,096 | 1/1965 | Lang | 137/564.5 |
| 3,414,522 | 12/1968 | Hoekstra | 137/7 X |
| 3,021,863 | 2/1962 | Low | 137/564.5 X |
| 3,025,876 | 3/1962 | Wolfe | 137/564.5 |
| 3,292,650 | 12/1966 | Bird et al. | 137/93 |
| 3,556,141 | 1/1971 | Hind | 137/564.5 |

FOREIGN PATENTS OR APPLICATIONS

| | | | |
|---|---|---|---|
| 899,681 | 6/1962 | Great Britain | 137/100 |

*Primary Examiner*—M. Cary Nelson
*Assistant Examiner*—David J. Zobkiw

[57] ABSTRACT

A dialysate proportioning system in which salt concentrate and water from two lines are combined in a mixing chamber, the pressure drops across a linear concentrate resistor in the concentrate line and a linear water resistor in the water line are maintained at equal values by pressurization of the concentrate in a reservoir, and the conductivity of the dialysate is maintained by an electrical conductivity control which varies a trim valve bypassing the water resistor.

4 Claims, 3 Drawing Figures

PATENTED SEP 12 1972 3,690,340

FLUID PROPORTIONING SYSTEM

This invention relates to a system for continuous proportioning of two or more fluids to provide a mixture of selectable and constant concentration.

In many applications it is desirable to combine fluids in a known ratio. Frequently, at least one of the fluids is contained in a reservoir, as, for example, a concentrated solution that is mixed with a high proportion of solvent to form a dilute solution. The solvent may also be contained in a reservoir, or it may be continuously obtained from a line.

Examples of such applications are proportioning devices in systems that supply dialysate fluid to hemodialyzers. Typically, in such systems a concentrated solution of salts flowing from a reservoir is mixed with tap water in a ratio of approximately 1 part of concentrate to 35 parts of water, so as to provide a dialysate solution of the desired concentration. The proportioning device must be capable of maintaining this concentration within prescribed limits for the duration of a hemodialysis treatment, on the order of six to fourteen hours. Existing proportioning means utilized in dialysate delivery systems are mostly positive displacement mechanical devices, such as pistons or rotary pumps, in which separate pumps of different volumetric capacities are used to supply the concentrate and the water. These pumps are expensive; they experience failure of moving seals; and they are susceptible to corrosion and salt deposition due to the highly concentrated solution. In addition, they are mechanically complex.

There are numerous other applications in the chemical process industries, food and beverage industries, and others where complex and expensive proportioning pumps are presently used to achieve a desired mixture.

It is an object of this invention to provide a mechanically simple system for the proportioning of two or more fluids in a mixture.

It is another object of this invention to provide a proportioning system at low cost.

It is a third object of this invention to provide a proportioning system of improved reliability by eliminating continuously sliding or rotating parts.

It is still another object of this invention to provide a fluid proportioning system of minimum size.

The invention is a fluid proportioning system that utilizes separate restrictions to meter the flows in the fluid lines. The pressure drops across the restrictions are equalized by a simple pressurizing scheme. In accordance with this system the outlet pressures of the restrictions are maintained at the same value, as, for example, by connecting the outlets of the restrictions to a common mixing chamber. The pressure of a first fluid at the inlet of a first restriction, is selected as a reference; and reservoirs containing the additive fluids are pressurized so that the pressures of the additive fluids at the inlets of their respective restrictions are equal to the reference pressure.

The following illustrations of this principle will be limited to the proportioning of two liquids for the sake of clarity. It is to be understood, however, that any number of fluids can be proportioned by expanding the system disclosed and that gases as well as liquids can be combined.

Figure 1:
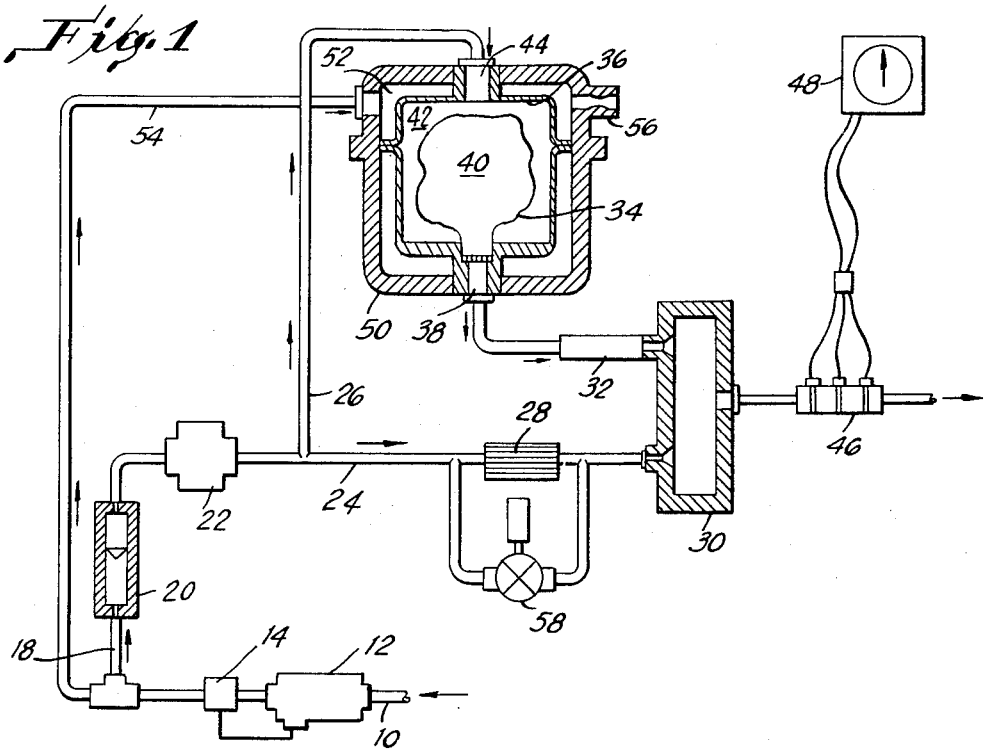
FIG. 1, is a schematic diagram of a simple fluid proportioning system as it might be applied to the preparation of dialysate solution.

Referring now to FIG. 1, it is seen that for the application illustrated, the proportioning system is used to mix water from a cold water supply with a concentrate so as to provide a dialysate solution of the required concentration. The cold water is supplied from an inlet tap 10 to a heater 12, which in conjunction with a thermostat 14, heats the output water to a constant temperature of approximately 95°F. The heated water passes through a tee 16, one branch of which 18 supplies the metered water, which functions as the solvent, to a flow meter 20, and from there to a flow controller 22 from which the water passes into two branches 24 and 26.

The water in branch 24 is fed to the water metering restriction 28, from which the water passes to a mixing chamber 30. The concentrate is fed to a mixing chamber 30 through a concentrate metering restriction 32, from a flexible bladder 34, which is contained in a reservoir 36. The output end of the bladder is sealed to an outlet port 38 so that the bladder effectively divides the reservoir into two volumes—one 40 internal to the bladder, and the other 42 external to the bladder. Since the bladder is flexible when it is expanded, i.e. when it is filled with concentrate, it effectively occupies the entire volume of the reservoir, so that the external volume 42 is very small compared with the internal volume 40. When the bladder is collapsed, as when it has been emptied on concentrate, the external volume 42 will be much larger than internal volume 40.

The external volume of reservoir 36 is connected to water branch 26 through port 44. Thus, the external reservoir volume 42 is always filled with water at the same pressure as the water inlet pressure to restriction 28. The bladder is made of rubber or plastic with a high degree of flexibility, so that the pressure required to collapse it is small compared to the water pressure. Therefore, the pressure of the concentrate within the bladder, hence that of the concentrate at the inlet to the concentrate metering resistor 32, is substantially the same as that of the water entering the water metering resistor 28. Since both metering resistors exhaust directly into the mixing chamber 30, their downstream pressures are identical. The mixed dialysate flows from the mixing chamber through a conductivity cell 46 which indicates the concentration of the dialysate solution on meter 48 for purposes of adjusting and monitoring the dialysate concentration.

The reservoir 36 is contained within an insulating water jacket 50 so that there is an enveloping volume 52 about the reservoir. Volume 52 is kept filled with hot water from tee 16 through branch 54. The rate of flow through volume 52 is limited to a relatively small amount by restriction 56. The water metering restriction 28 is paralleled by a micrometer control valve 58, which provides a fine adjustment of the water flow and, therefore, of the dialysate concentration as indicated on meter 48.

As previously described, the principle of operation is that if two fluid resistances have equal pressure drops across them, the flows through them will be in inverse proportion to the values of the resistances. As shown in FIG. 1, this can be simply achieved by having the resistors empty directly into a relatively large mixing volume and by pressurizing the concentrate so that the inlet pressure of the concentrate-metering resistor (i.e., restriction) equals that of the water-metering resistor. The inlet lines to both resistors are short and of relatively large area so as to reduce pressure loss between the pressurizing point and the resistors to a negligible value.

A major factor that must be taken onto account is the nature of the flows through the resistances. If the flows through both resistors are always well in the turbulent region, of if the flows are always in the laminar region, the resistors, whether orifice or linear elements, will have stable characteristics. A difficulty arises when one or both of the resistors are in a transition zone during part or all of the range of flow rates encountered. The problem then is to select the proper sizes and geometries of the resistors in combination with suitable working pressures to achieve calibrations which are stable within the required tolerances over the output flow range.

With:
$Q$ = Volumetric flow rate
$P$ = Pressure drop across a resistor
$a$ = Cross-sectional area of a resistor
$\rho$ = Fluid density
$\mu$ = Fluid dynamic viscosity
$D$ = Equivalent cross-sectional dimension (Diameter of orifice or of pore in multi-path resistor)
$L$ = Length of resistor
$C_t$ = Turbulent flow constant
Subscript $c$ = Concentrate
Subscript $w$ = Water For turbulent flows in both resistors:

$$Q = C_t a (\rho \Delta P)^{1/2}$$
$$\frac{Q_c}{Q_w} = \frac{C_{tc} a_c (\rho_c)(\Delta P)^{1/2}}{C_{tw} a_w (\rho_w)(\Delta P)} = \frac{C_{tc} a_c (\rho_c)}{C_{tw} a_w (\rho_w)}$$

For viscous (e.g., capillary) flows in both resistors:

$$Q = \frac{D^2 a \Delta P}{32 \mu L} = .0244 \frac{D^4 \Delta P}{\mu L}$$

$$\frac{Q_c}{Q_w} = \frac{.0244 \frac{D_c^4}{\mu_c} \frac{\Delta P}{L_c}}{.0244 \frac{D_w^4}{\mu_w} \frac{\Delta P}{L_w}} = \frac{(D_c)^4 (\mu_w)(L_w)}{(D_w)^4 (\mu_c)(L_c)}$$

It is evident that the metering resistors can be either linear elements of a type to provide laminar flow such as a capillary tube (or multiple parallel capillaries for higher flow rates), or a dynamic resistor, such as an orifice or venturi. If the two resistors are both dynamic and there is turbulent flow in each, then the ratio of the flows is directly proportional to the density of the fluids passing through the two resistors. Quite frequently, and particularly in the case of dialysate concentrate and water, although the densities may vary with temperature, the ratio of the densities shows a negligible change with temperature, and the flow ratio is fixed by the constant geometries of the resistors. If both resistors are linear elements and laminar flow exists in both, then the ratio of the flows through them is inversely proportional to the ratio of the viscosities. Again, although the viscosities may vary considerably with temperature, the ratio of this change is frequently constant as in the case of concentrate and water. If one of the resistors is linear, as for example, concentrate-metering resistor 32, and the other (i.e., water-metering resistor 28) is a dynamic resistance, then the ratio of the two flows is inversely proportional to the viscosity of the fluid passing through the linear resistor, that is to the concentrate viscosity. In this case, if the viscosity of the concentrate varies with temperature change to alter the flow ratio to a greater degree than is acceptable, some means of temperature control must be introduced, as shown in FIG. 1.

An alternate means of maintaining a constant temperature is to supply a thermal water jacket about the concentrate-metering restriction 32 rather than the reservoir 36.

A source of error in maintaining equal pressure drops across the two metering resistors is a change in pressure of the liquid in the reservoir (i.e., concentrate) due to the change in level as it is withdrawn. This variation is minimized when the specific gravities of the pressurizing and pressurized liquids in the reservoir are approximately the same. When there is a substantial difference in the specific gravities of the two fluids, compensation can be provided by deliberately introducing a stiffness into the bladder or membrane. A simple construction for the reservoir to illustrate this can be visualized as a piston with a rolling diaphragm seal which is spring-loaded and in which the change in pressure due to the change in level, is compensated by the change in resisting forces of the spring.

Figure 3:
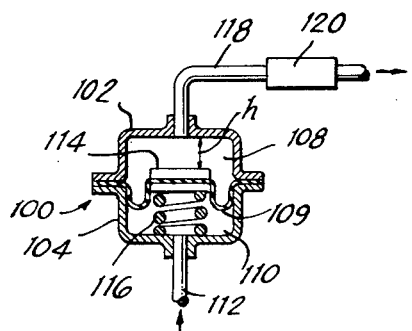

This arrangement is shown in FIG. 3. Here the reservoir 100 consists of two housings 102 and 104 with a common vertical axis, a deep-convoluted rolling diaphragm 106, clamped between the housings, dividing the reservoir into two chambers, chamber 108, containing concentrate, and chamber 110 supplied with water through conduit 112, a piston 114 attached to the diaphragm, a spring 116 within chamber 110 and coaxial with the vertical housing axis acting on piston 114 in a direction to expel the concentrate from chamber 108 through conduit 118 and concentrate metering resistor 120. Without compensation the pressure at the inlet to the concentrate metering resistor would be less than the pressure at the inlet to the water metering resistor by an amount proportional to the height of the concentrate column, $h$, and the difference between the weight density of concentrate, $\gamma_c$, and the weight density of water, $\gamma_w$. The pressure at the inlet to the concentrate metering resistor is increased by the action of spring 116 against piston 114. Denoting the change in pressure due to the column height of concentrate as $\Delta P_{c_h}$, and the change in pressure due to the spring as $\Delta P_{c_s}$, the area of the piston as $A_p$, and the spring rate as $K$;

$\Delta P_{c_h} = (h)(\gamma_c - \gamma_w)$
$\Delta P_{c_s} = Kh/A_p$
For full compensation;
$\Delta P_{c_s} = \Delta P_{c_h}$
$Kh/A_p = (h)(\gamma_c - \gamma_w)$
$K = (\gamma_c - \gamma_w) A_p$ Letting $\gamma_c = \gamma_w (sg)_c$, where $(sg)_c$ is the specific gravity of concentrate,
The spring rate,
$K = A_p \gamma_w [(sg)_c - 1]$ Another source of error can be an unbalanced stiffness of the bladder or membrane. The proportioning system shown in FIG. 1, was tested with a reservoir utilizing a commercially available rolling diaphragm as a membrane in place of the bladder. Inversion of the membrane from the full to the empty condition of the reservoir required a differential pressure of less than 1½ inches of water.

The tests also indicated that both the flow rate through the two metering resistors and the concentration of the mixed output flow remain constant within an accuracy of ±2 percent. It should be possible to improve this accuracy by an order of magnitude with application of suitable controls, such as maintenance of constant temperature, and matching of the membrane stiffness with the specific gravity head variation.

Figure 2:
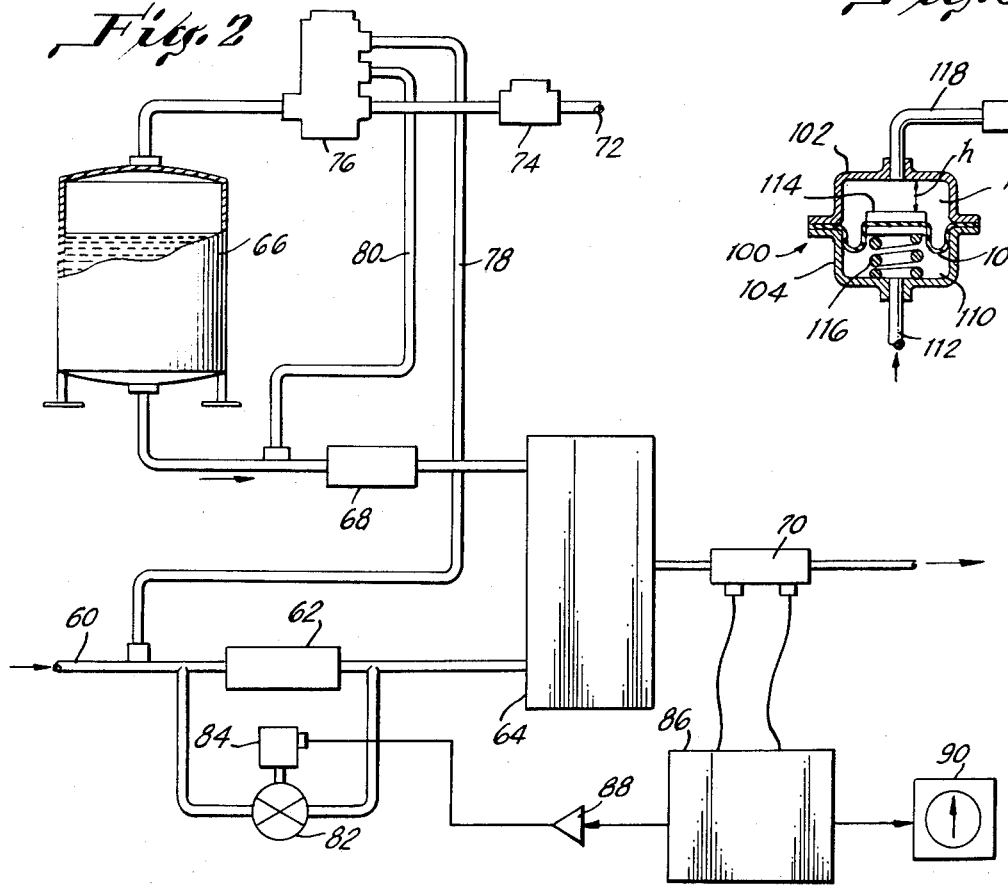
FIG. 2, is a schematic diagram of another system that can be used in proportioning dialysate or similar solutions.

The system of FIG. 2, utilizes a reservoir containing a concentrated liquid which is pressurized with air at the same pressure as a reference pressure. In this case, a membrane is not essential although it may be desirable to separate the two fluids in the reservoir. The system again illustrates the mixture of water from a supply with a concentrate to provide an output solution for hemodialyzers. The water is supplied from an inlet tap 60, to a water-metering restriction 62, which communicates with mixing chamber 64. The concentrate is fed from reservoir 66 to a concentrate-metering restriction 68, which also communicates with mixing chamber 64. The dialysate flows out from the mixing chamber through conductivity cell 70, which is used to monitor its concentration. The concentrate in the tank is pressurized with air obtained from a pneumatic line 72. The air passes through a pressure regulator 74, and then to a differential pressure controller 76, whose function is to supply air to the reservoir at a pressure which will maintain the liquid inlet pressure to the concentrate-metering restriction and the water-metering restriction at equal values. Water is led to the differential controller from the inlet of the water-metering restriction by branch 78. The concentrate is led to the differential pressure controller from the inlet of the concentrate-metering restriction through branch 80.

The water-metering restriction is paralleled by a trim valve 82 which is positioned by an electrical servo motor 84. The purpose of the motor-driven valve is to serve as a fine adjustment of the water-metering restriction to maintain the dialysate output concentration at a desired value in the event of unanticipated errors or fluctuations. The valve can be made to have a limited effectiveness so that failure of the valve positioner will not cause a catastrophic change in the outlet concentration.

The conductivity cell 70 is one leg of a resistive bridge 86, which is set for balance at the conductivity corresponding to the desired concentration of dialysate. The bridge is excited by an alternating electrical voltage. In the event of a conductivity error an imbalance voltage is fed to amplifier 88, which drives servo motor 84 and, therefore, valve 82 so as to change the water-metering resistance; varying the ratio of the water and concentrate flows and restoring the conductivity of the output solution to the desired value. The output signal from bridge 86 is also fed to meter 90 to indicate actual concentration of the dialysate.

The instrumentation components shown in FIGS. 1 and 2, can be of many well-known types that are commercially available. The flow controller can be of a type, such as a "Micropump Model 812," wherein a restriction is varied with differential pressure to maintain a constant output flow at various inlet pressures. The conductivity cell can be of a flow-through type with platinized platinum electrodes, such as "Arthur H. Thomas Company No. 3997-F." The conductivity bridge can be a null-indicating resistive type, such as "Model 31" manufactured by Yellow Spring Instrument Company. The pneumatic controller can be of a diaphragm type in which the inlet air pressure is modulated so that the output air pressure is equal to the difference between a reference pressure and a feedback pressure, both of which are supplied without flow. Typical of such a device is a "Metagraphic Controller" made by The Bristol Company.

Although the examples described heretofore have illustrated a proportioning of liquid, it is evident that the same system can be used for proportioning of gases, particularly, at relatively low velocities and with linear metering-resistors to assure laminar flows. Evidently, for the proportioning of gases it would be necessary to provide a membrane in reservoir 66, shown in FIG. 2, so as to prevent diffusion between the pressuring air and the gases.

Also, it should be evident from the above description, that any number of liquids can be blended in a mixing chamber by increasing the number of reservoirs and associated metering restrictions and pressurizing each reservoir with a pressure identical to the inlet pressure of the reference metering restriction obtained, for example, from branch 26 of FIG. 1.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. A dialysate proportioning system including a pressurizable reservoir containing a salt concentrate; a water inlet tap; a linear water resistor with an inlet and an outlet, characterized by a linear relation between flow rate and pressure drop caused by laminar flow of water therethrough; a linear concentrate resistor with an inlet and an outlet, characterized by a linear relation between flow rate and pressure drop caused by laminar flow of concentrate therethrough; a dialysate mixing chamber with an outlet and communicating directly with the outlets of the two resistors; a water conduit, connected between the water inlet tap and the inlet of the water resistor; a concentrate conduit, connected between the pressurizable reservoir and the concentrate resistor; means to apply pressure to the concentrate in the reservoir so that the pressure in the concentrate conduit at the inlet to the concentrate resistor is equal to the pressure in the water conduit at the inlet to the water resistor; an electric motor-driven trim valve, connected in a line bypassing the water resistor, said valve having a minimum resistance substantially greater than that of the water resistor to provide a fine adjustment of the water resistor with limited effectiveness; a dialysate conduit connected to the outlet of the mixing chamber; means including an electrical conductivity sensor in the dialysate conduit for driving the valve in response to variation in conductivity to effectively change the resistance of the water resistor and thereby varying the proportion of the water and concentrate flows to maintain the dialysate concentration at a selected value.

2. A dialysate proportioning system of the character claimed in claim 1 in which the reservoir pressurizing means includes a flexible membrane dividing the reservoir into two chambers, a first chamber containing the concentrate, and a second chamber containing water, and a pressurizing conduit connecting the second chamber with the water conduit.

3. A dialysate proportioning system of the character claimed in claim 1 in which the reservoir pressurizing means includes a pneumatic line supplying compressed air; an air pressure controller with a compressed air supply port, first and second fluid pressure inlet ports, and an outlet port, said controller supplying a control air pressure at the outlet port related to the difference between the fluid pressures at the first and second inlet ports, a connection between the pneumatic line and the air supply port; a concentrate pressure line between the concentrate conduit and the first inlet port; a water pressure line between the water conduit and the second inlet port, and a control air pressure line between the outlet port and the reservoir.

4. A dialysate proportioning system of the character claimed in claim 1, including means to maintain the concentrate supplied to the concentrate resistor at the same temperature as the water supplied to the water resistor.

* * * * *